8242X
S. Barber,
Reciprocating Steam Engine.
Patented June 14, 1834.
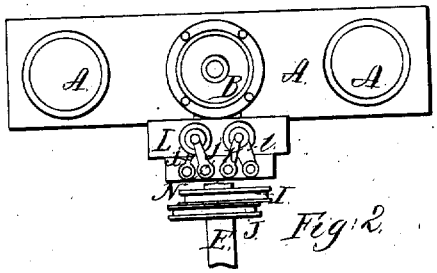
Fig. 2.
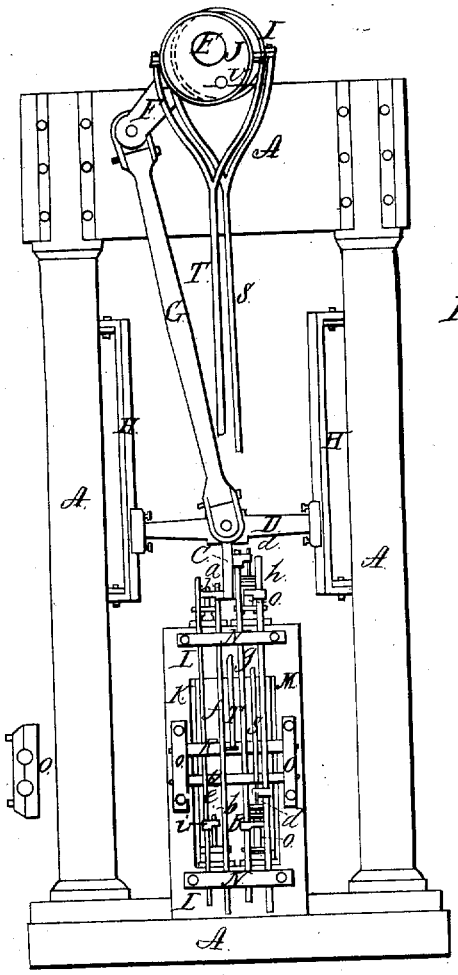
Fig. 1.
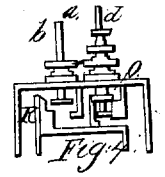
Fig. 4.
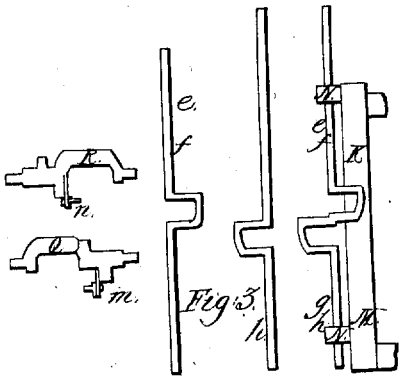
N. PETERS, PHOTO-LITHOGRAPHER, WASHINGTON, D. C.

2427

8242X 255.

Sprague Barber Patented June 14. 1834.

The Schedule referred to in these Letters Patent, and making part of the same containing a description in the words of the said Sprague Barber himself, of his improvement in the Steam Engine, called the Expansive steam Engine.

Be it known and remembered, that I, Sprague Barber of Providence, in the County of Providence and State of Rhode Island, have invented a new and useful improvement on the Steam Engine now in use, called by me the Expansive Steam Engine. the construction, operation, and advantages of which are thus specified and described to wit. —

On the Shaft E, which in the drawing annexed represents what in the Bolton and Watt Steam Engine is called the main Shaft, is placed an eccentric J, the centres of which correspond with the centres of the main eccentric I, of the common Engine – The eccentric J, is called the expansive eccentric, it moves easily on said Shaft, does not move with it necessarily, but derives its motion from its being connected with the main eccentric I. – This connection is formed by a bolt that passes through each eccentric making the eccentric J, move with the eccentric I, and with the Shaft E, on which both stand, the eccentric I, being with it. – This bolt passes through a slot in the eccentric J which is parallel with the always ~~always~~ fastened on said Shaft turning the circumference of said eccentric, and the bolt being loosened this eccentric can be turned on the Shaft, so that the centres of each eccentric can be placed opposite each other, or not at the pleasure of the engineer, and so that the expansive eccentric will precede the main eccentric in its operation as much as is requisite to insure the full advantages of this improvement.

K in the drawing is the leading steam pipe. L.L. the valve Chests. M. is the exhaust pipe. These are made in the same way and form as those in common use, and their relative positions are the same, except that the valve Chests being of greater length to make room for the expansive valves here-in after described, the leading steam pipe and the exhaust pipe are farther apart. From the eccentric J, passes down the expansive rod T, which is fastened to the eccentric J, in the same way and manner that the main eccentric rod S, is fastened to the main eccentric I. This rod T extends down and is connected with the expansive rocker R in the same way and man-ner that the main eccentric rod S. is fastened to the main rocker Q. The

8242X expansive rocker R turns in the rocker stands O, O, one of which is attached to the leading steam pipe K and the other to the exhaust pipe M, being the same as those in which the main rocker Q turns, and are formed in the same way and fastened in the same manner as those stands are in the common Engine. The rocker R is placed either above or below the rocker Q, at pleasure of the maker. N. N are stands for the valve rods, e f g, h, and through which they pass. These stands are fastened to the valve chests I, I, in the same manner that they are in the common Engine. The main valve rods g, and h, operate in the same manner, and upon the same valves as in the common Engine. The valve rods e, and f, are operated by the expansive Rocker R, in the same manner that the main valve rods g, and h, are by the rocker Q. The valve chests I, I, are made so much longer than the valve chests in common use as to admit of the insertion of one of the expansive valves a and b within each of them, just before the leading valves e, and f. These expansive valves are formed by the insertion of a partition within each of the valve chests extending entirely across them, excepting only a passage for the steam to pass through when the valves are opened. The form and position of these valves and partitions are fully shown in Fig: 4.

In operating an Engine with this improvement added to it, it is evident if the centres of the two eccentrics are placed directly opposite each other, so that their circumferences will correspond together, that the improvement will produce no effect on the operation of the Engine as the cut off, or expansive valves would open and close at the same instant with the leading valves, of course they are not intended to be so placed. The intention is that the expansive eccentric should be in advance of the main eccentric. Suppose this advance to be sixty degrees. The consequence then will be that when the Crank F comes within sixty degrees of its lower centre, the eccentric J, operating upon the rocker R, and through it upon the valve rods e, and f, closes the valve b, in the lower valve chest operated by the valve rod e has opened the valve a in the [illegible] chest operated by the valve rod f. Until the valve b, is closed, the steam is not effected in its course or power by this improvement, but it passes upon the leading c, with the same presure it does upon the boiler when the crank F, passes its lower centre, the leading valve is opened and the steam passes into the cylinder B, and drives the piston C, upward until the crank F, comes within sixty degrees of its upper centre, when the valve b, closes and the valve a, opens leaving the piston to perform the remaining part of its upward stroke by the expansive force of the steam in the cylinder; when the crank F comes on its upper centre, the leading valve at the top is ~~operated~~ opened and admits the steam into the cylinder above the piston, which drives the piston down until the crank F, comes within sixty degrees of its lower centre when the valve a closes, and leaves the piston to perform the remaining part of its downward stroke by the expansive force of the steam in the cylinder.

This improvement can be applied either to high or low pres-sure engines either horizontal diagonal or perpendicular working with cross head or lever beam. The advantages resulting from this improvement are - First - The position of the cut off valves so near the leading valves, admits the steam at each operation to pass into the cylinder with the same presure, that it is in the boiler, and immediately upon the opening of the leading valves. Second as the cut off valves open before the engine comes on its centres the steam ac-cumulates upon the leading valves before they are opened, so that as soon as they are opened, the steam passes into the cylinder with a presure equal to the presure of the steam in the boiler and this upon its first admission into the cylinder. A regulator on an engine would not affect the improvement as that operates only on the last part of the steam passing into the Cylinder - Third, an Engine with this improvement will perform the same work with a far less quantity of fuel than an ordinary Engine -

What I claim as my invention and for which I ask the exclusive benefit is the compound eccentric on the main shaft formed by adding another eccentric to the main eccentric in common use by means of which two different motions can be produced the form of connexion between said two eccentrics as afore described by which the motion produced by one may be made to precede the motion of the other as circumstances may require - and

82427X the insertion of cut off valve in each of the ~~above~~ valve chests just before each of the leading valves of the common Engine, thereby compounding the operation of the cut off and leading valves and regulating the quantity of steam that passes into the Cylinder.

Sprague Barber.

Witnesses
Franklin Barber }
William R. Staples }

Drawing

Exd. W.G.C.

(1303 wds (Rect. & Recd anew June 30. 1840.)